United States Patent
Podnar

(10) Patent No.: US 10,080,981 B2
(45) Date of Patent: Sep. 25, 2018

(54) IN-LINE CENTRIFUGAL SEALANT DEBUBBLER

(71) Applicant: The Boeing Company, Chicago, IL (US)

(72) Inventor: Gregg W. Podnar, Chicago, IL (US)

(73) Assignee: The Boeing Company, Chicago, IL (US)

( * ) Notice: Subject to any disclaimer, the term of this patent is extended or adjusted under 35 U.S.C. 154(b) by 173 days.

(21) Appl. No.: 15/058,721

(22) Filed: Mar. 2, 2016

(65) Prior Publication Data

US 2017/0253351 A1 Sep. 7, 2017

(51) Int. Cl.
*B01D 19/00* (2006.01)
*B64C 1/06* (2006.01)
(Continued)

(52) U.S. Cl.
CPC ..... *B01D 19/0052* (2013.01); *B01D 19/0026* (2013.01); *B05C 5/02* (2013.01);
(Continued)

(58) Field of Classification Search
CPC . B01D 19/00–19/0495; B01D 19/0026; B01D 19/0052; B01D 19/0057;
(Continued)

(56) References Cited

U.S. PATENT DOCUMENTS

| | | |
|---|---|---|
| 3,299,195 A | 1/1967 | Chenoweth et al. |
| 3,523,406 A | 8/1970 | Chenoweth et al. |

(Continued)

FOREIGN PATENT DOCUMENTS

| | | |
|---|---|---|
| CN | 102470288 A | 5/2012 |
| CN | 102470288 B | 1/2015 |

(Continued)

OTHER PUBLICATIONS

European Search Report issued in European Patent Application No. 16204424.2 dated Jun. 22, 2017.
(Continued)

*Primary Examiner* — T. Bennett McKenzie
(74) *Attorney, Agent, or Firm* — McDonnell Boehnen Hulbert & Berghoff LLP

(57) ABSTRACT

Systems for removing gas from a sealant and transferring gas-less sealant to an applicator are provided. The system may comprise: a rotatable chamber including: a first opening for receiving sealant; a hollow conduit arranged such that when gas accumulates in the center of the rotatable chamber when the rotatable chamber is rotating, the gas is ventable from the rotatable chamber; a second opening for receiving gas-less sealant from the rotatable chamber after the gas is vented from the hollow conduit; and a motor operatively configured to rotate the rotatable chamber; and a gas-less sealant applicator in fluid communication with the second opening of the rotatable chamber such that gas-less sealant released by the second opening is flowable into the applicator. The system may also include a robot arm including an end effector with a sealant dispensing nozzle. A method for applying sealant to an aircraft structure is also provided.

19 Claims, 3 Drawing Sheets

(51) Int. Cl.
  *B64C 3/00* (2006.01)
  *B64D 37/02* (2006.01)
  *B64F 5/00* (2017.01)
  *B05C 5/02* (2006.01)
  *B05C 17/005* (2006.01)
(52) U.S. Cl.
  CPC .......... *B05C 5/0225* (2013.01); *B05C 17/005* (2013.01); *B05C 17/00579* (2013.01); *B64C 1/068* (2013.01); *B64C 3/00* (2013.01); *B64D 37/02* (2013.01); *B64F 5/0009* (2013.01)
(58) Field of Classification Search
  CPC ....... B05C 5/02; B05C 5/0225; B05C 17/005; B05C 17/00579; B64C 1/068; B64C 3/00; B64D 37/02; B64F 5/0009
  USPC .................................................. 95/241–266
  See application file for complete search history.

(56) References Cited

U.S. PATENT DOCUMENTS

| | | | | |
|---|---|---|---|---|
| 4,324,557 A | * | 4/1982 | Wegstedt | G01N 1/28 422/72 |
| 5,127,547 A | * | 7/1992 | Gerich | B01F 15/0454 222/137 |
| 8,534,906 B2 | | 9/2013 | Harada | |
| 2004/0223887 A1 | * | 11/2004 | Bargh | B01D 19/0031 422/400 |
| 2014/0026754 A1 | * | 1/2014 | Nakazawa | B01D 19/0057 95/242 |
| 2014/0234011 A1 | | 8/2014 | Tomuta et al. | |
| 2015/0083041 A1 | | 3/2015 | Yang et al. | |

FOREIGN PATENT DOCUMENTS

| | | |
|---|---|---|
| JP | 2015110211 A | 6/2015 |
| WO | 8803045 A1 | 5/1988 |
| WO | 2013059056 A1 | 10/2013 |
| WO | 2013159046 A1 | 10/2013 |

OTHER PUBLICATIONS

Extended European Search report for application No. 16204424.2, dated Oct. 20, 2017.

Partial European Search Report for application No. 16204424.2, dated Jun. 22, 2017.

* cited by examiner

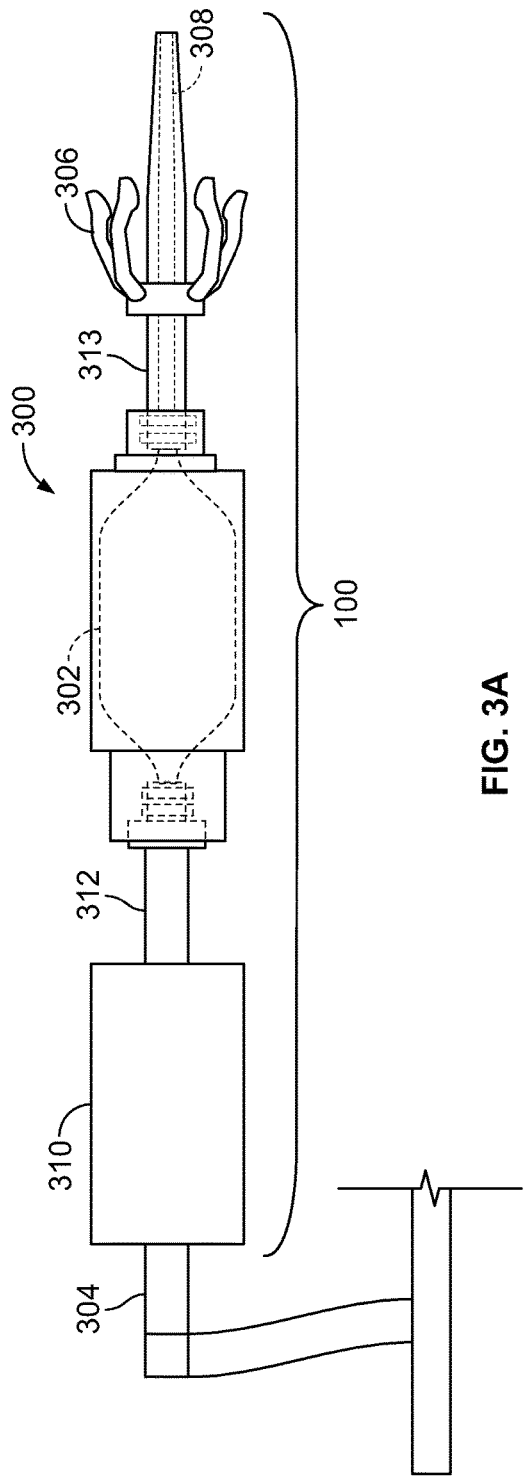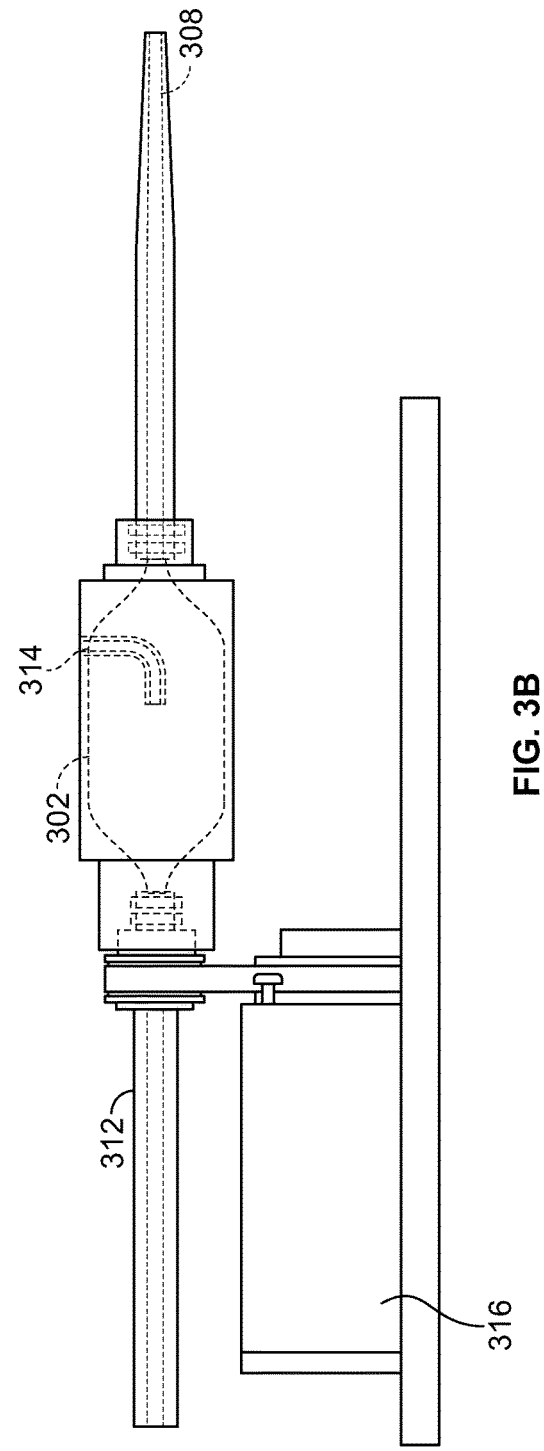

IN-LINE CENTRIFUGAL SEALANT DEBUBBLER

TECHNICAL FIELD

The present disclosure relates generally to methods and apparatuses for the removal of gas bubbles from a fluid.

BACKGROUND

Sealants are materials used to form airtight or watertight seals between two parts. For example, sealants may be used in the aircraft industry on fuel tanks, fuselage, and wings, among other aero parts.

Manufacturers often use pre-mixed frozen cartridges of sealants from a supplier. Sealant cartridges from the supplier often include voids (air or gas bubbles) as air may enter the sealant cartridges when they are frozen and thawed. In addition, when being used in a pneumatic sealing tool, air may be forced past the cartridge plunger into the sealant. When a bubble is in the sealant, it is expressed rapidly causing a seal flaw. A sealer must either stop and rework the seal bead or later rework a flaw identified by an inspector. Furthermore, these gas bubbles may take up enough volume that the sealant cartridge seems lightweight to the sealer, causing the sealer to discard the cartridge before use. For robotic sealing, these bubbles incur even more inspection and rework. For example, when aircraft wing panels are baked, small bubbles expand and can form flaws not apparent to the sealer during application.

Current methods and apparatuses are not capable of inline removal of gas bubbles from viscous fluids such as sealants. Thus, there is a need for safe and efficient methods and apparatuses for the removal of gas bubbles from such fluids.

SUMMARY

According to an example embodiment, a system for removing gas from a sealant and transferring gas-less sealant to an applicator. The system comprises: a rotatable chamber including: a first opening for receiving sealant; a hollow conduit arranged such that when gas accumulates in the center of the rotatable chamber when the rotatable chamber is rotating, the gas is ventable from the rotatable chamber; a second opening for receiving gas-less sealant from the rotatable chamber after the gas is vented from the hollow conduit; a motor operatively configured to rotate the rotatable chamber; and a gas-less sealant applicator in fluid communication with the second opening of the rotatable chamber such that gas-less sealant released by the second opening is flowable into the applicator.

According to another example embodiment, a method for applying sealant to an aircraft structure is provided. The method comprises receiving sealant at a rotatable chamber; rotating the rotatable chamber such that: the sealant is separated in a gas-less sealant and a gas; and the gas is vented outside the rotatable chamber; and urging the gasless sealant to an applicator.

According to another example embodiment, system for providing sealant to an aircraft structure during manufacturing is provided. The system comprises: a robot arm including an end effector with a sealant dispensing nozzle; a sealant supply including a supply of raw sealant; a rotatable chamber disposed on the robot arm; and a sealant line connected to the end effector and to the rotatable chamber; the rotatable chamber configured such that when gas accumulates in the center of the rotatable chamber when the rotatable chamber is rotating, the gas is ventable from the rotatable chamber and gasless sealant is provided to the sealant line, with the gasless sealant being delivered directly to the end effector via the sealant line.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and descriptions thereof, will best be understood by reference to the following detailed description of an example embodiment of the present disclosure when read in conjunction with the accompanying drawings, wherein:

FIG. 3A is a diagrammic representation of an apparatus of the present disclosure;

FIG. 3B is a diagrammic representation of an apparatus of the present disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

This disclosure seeks to provide a solution to problems that can arise due to the presence of gas in a sealant. The disclosed methods and apparatuses could be used by aircraft manufacturers, automobile manufacturers, and electronic industries among others. The advantages over prior apparatuses and methods include safety (e.g. less exposure to sealants) and cost savings (e.g. less wasted sealant). By removing gas from a sealant immediately before use, the sealer can avoid using cartridges that have large quantities of air included, thus avoiding the concomitant rework.

Figure 4:
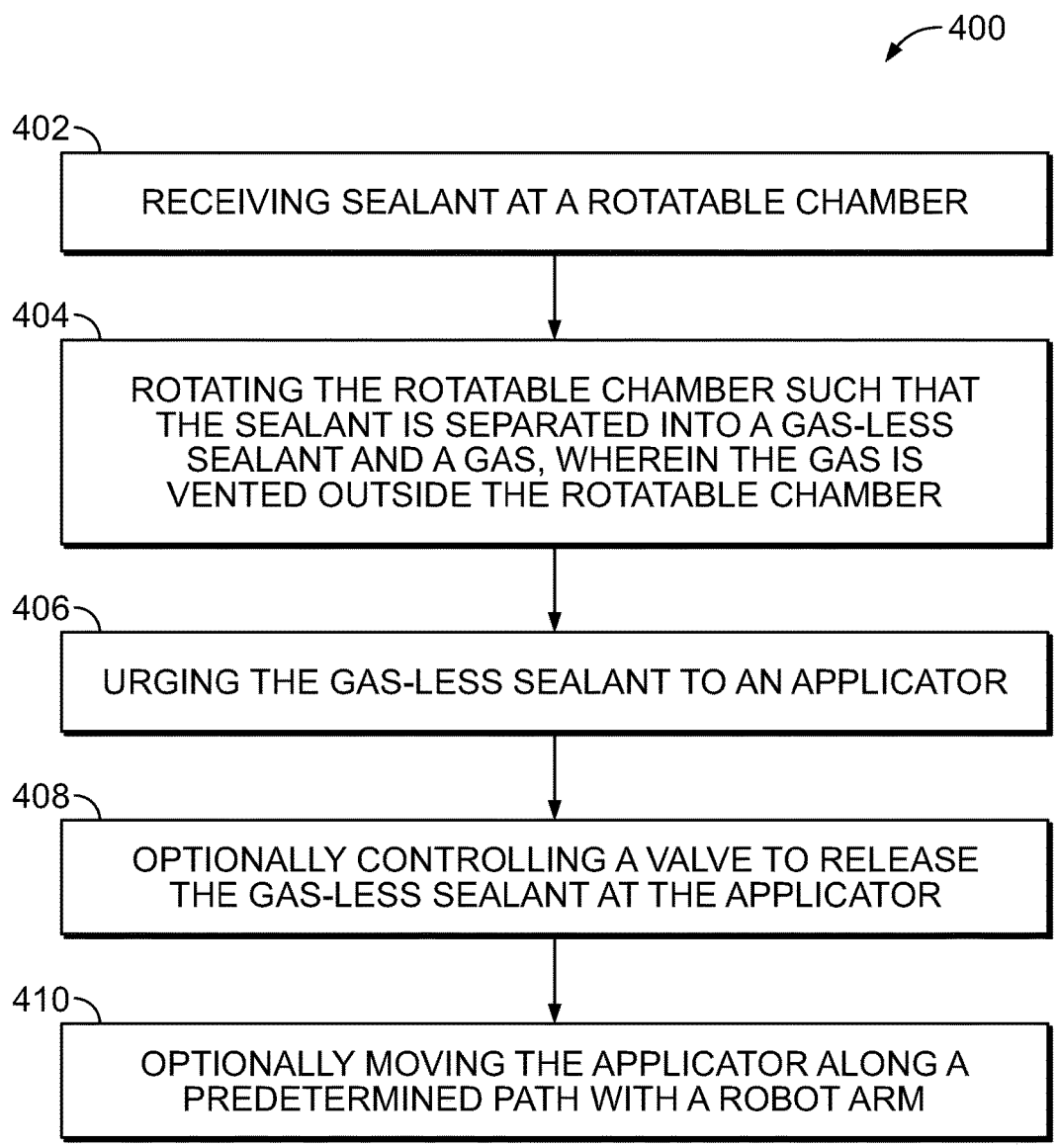
FIG. 4 is a block diagram of a method according to an example embodiment.

This disclosure provides methods and systems of removing gas from a fluid. Examples of such systems are shown in FIGS. 1, 2, 3A, and 3B. An example of a method as provided in disclosure is shown in FIG. 4.

Figure 1:
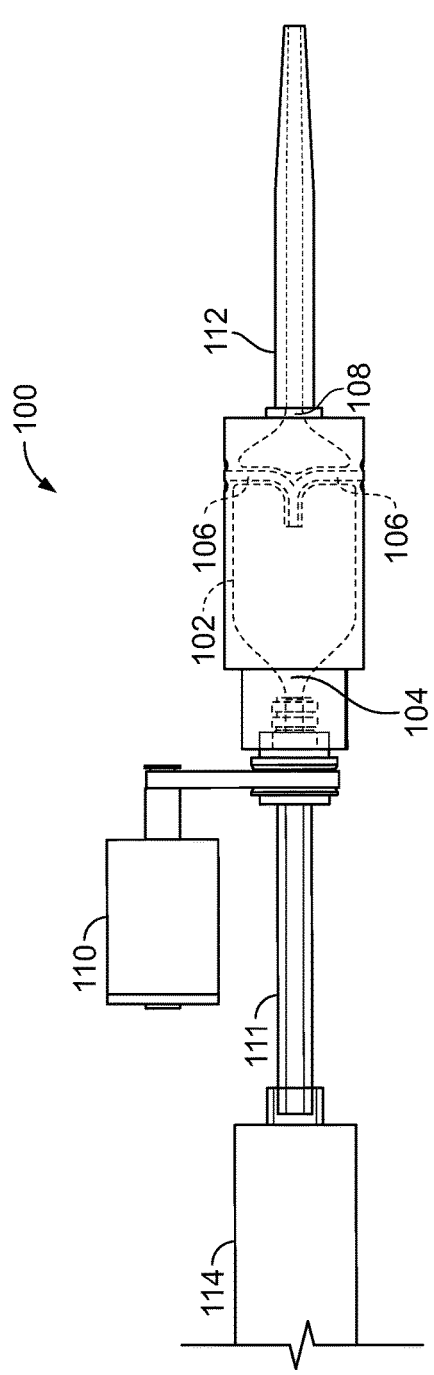
FIG. 1 is a diagrammic representation of an apparatus of the present disclosure.

In FIG. 1, system 100 includes a rotatable chamber 102. The rotatable chamber 102 has a first opening 104, at least one hollow conduit or opening 106, a second opening 108, a motor 110, and an applicator 112. First opening 104 and second opening 108 may be of the same or similar diameter. First opening 104 receives fluid from a fluid source (not shown) into the rotatable chamber 102. The fluid may generally be a viscous, thixotropic or compressible fluid or, specifically, a sealant for use on an aircraft. The viscosity of the fluid may be at least about 200 Pa-s and may be as great as about 1300 Pa-s. In other embodiments, the fluid may be used in any industry that uses viscous fluids, such as food processing, personal care products, plastics processing (molten material for molds), metal smelting, pharmaceuticals, or petrochemicals.

As shown in FIG. 1, the rotatable chamber 102 receives a fluid from a fluid repository 114 in fluid communication with first opening 104 of the rotatable chamber 102. The repository 114 is pressurized such that fluid is urged from the repository 114 to the first opening 104. The fluid may be urged from the repository 114 to the first opening through a sealant line 111. The rotatable chamber 102 receives fluid from the first opening 104. A motor 110 is configured to rotate the rotatable chamber 102. As the rotatable chamber 102 is rotated, gas within the fluid is separated from the fluid such that the fluid is urged towards the inner walls of the rotatable chamber 102 and gas is urged towards the center of rotatable chamber 102. Hollow opening 106 is arranged such that gas accumulating at the center of rotatable chamber 102 is ventable from the rotatable chamber 102. The hollow opening 106 may be constructed as a single tube (or other shape) with a first opening in the center of the rotatable chamber 102 and a second opening outside of the rotatable chamber 102. The hollow conduit 106 may further be constructed as a plurality of tubes (or other shapes) with first openings at or near the center of the rotatable chamber 102 and second openings outside of the rotatable chamber 102. After the gas is removed from the fluid, the second opening 108 receives gas-less fluid. A gas-less fluid applicator in fluid communication with the second opening 108 applies gas-less fluid to the intended application surface.

Figure 2:
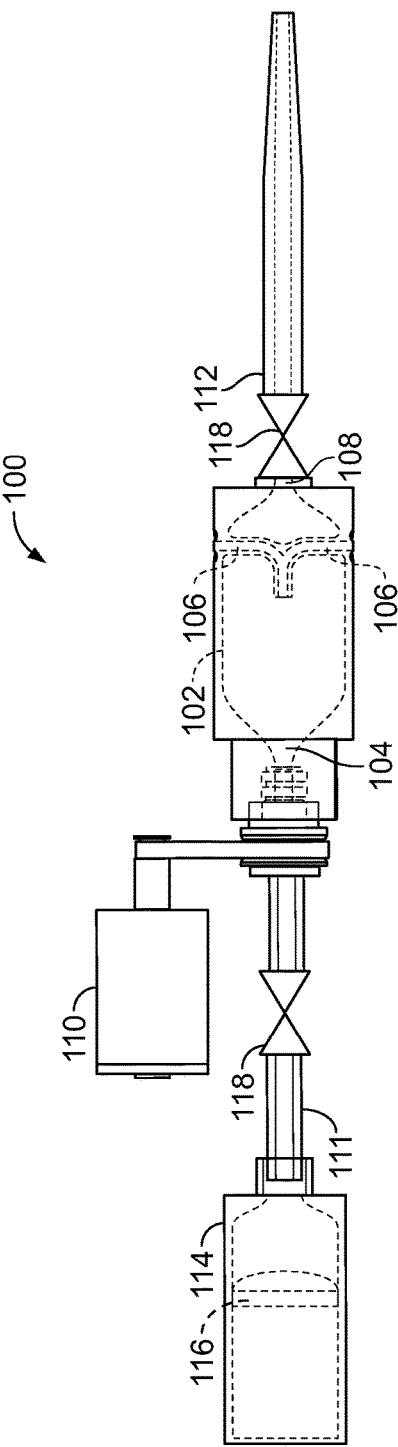
FIG. 2 is a diagrammic representation of an apparatus of the present disclosure.

The repository 114 may take any form suitable for storing a sufficient amount of fluid. In practice, however, the repository 114 can take the form of a conventional sealant cartridge, a bladder, a tube with a piston, or a fluid mixing system. The methods by which the repository 114 is pressurized include, but are not limited to, a piston 116, as shown in FIG. 2, or a pressurized gas source. The piston 116 can be pneumatically actuated or powered by a human operator. In order for the fluid to travel from the repository to the rotatable chamber, the pressure differential between the repository 114 and the rotatable chamber 102 should be at least about 100 psi. In this embodiment, the fluid may be pumped through an on/off valve 118 that keeps the material pressurized. The on/off valve 118 may be placed between the repository 114 and the first opening 104 and/or between the second opening 108 and the applicator 112. When the on/off valve 118 is placed is placed between the second opening 108 and the applicator 112, some acceptable amount of fluid may be released by the hollow opening 106.

Motor 110 may be operatively configured to rotate the rotatable chamber 102 by way of belts, gears, or other methods as known in the art. In some embodiments, motor 110 will rotate the rotatable chamber at least about 1800 RPM.

In some embodiments, the rotatable chamber 102 will receive aircraft sealant, compressible fluid or a thixotropic fluid. Thixotropic fluids are thick or viscous under static conditions and become less viscous when shaken, agitated or otherwise stressed. Some aircraft sealants are both thixotropic and compressible. A traditional centrifuge will not effectively remove gas from these sealants because the properties of the sealants result in ambient gases re-entering the sealant when exposed to the atmosphere. Unlike a traditional centrifuge, the system 100 removes gas from a fluid and immediately makes the gas-less fluid available to the applicator.

As shown in FIG. 3A, the system 100 may be part of a larger system 300 (the "sealant application system") for providing sealant to an aircraft structure during manufacturing. Sealant application system 300 includes a robot arm 304 with an end effector 306 and a sealant dispensing nozzle 308. The sealant application system 300 includes a sealant supply 310 for supplying the sealant application system 300 with raw sealant. A rotatable chamber 302 is disposed on the robot arm 304. A first sealant line 312 connects to the sealant supply 310 and the rotatable chamber 302. A second sealant line 313 connects the rotatable chamber 302 and the end effector 306.

As part of the sealant application system 300 shown in FIG. 3A, rotatable chamber 302 receives raw sealant from the sealant supply 310. The rotatable chamber 302 is configured such that when gas accumulates in the center of the rotatable chamber 302, when the rotatable chamber is rotating, the gas is ventable from the rotatable chamber 302 and gasless sealant is provided to the first sealant line 312, with the gasless sealant being delivered directly to the end effector 306 via the first sealant line 312.

The rotatable chamber 302 receives raw sealant from the sealant supply 310 by way of the first sealant line 312. The sealant supply 310 is pressurized such that sealant is urged from the sealant supply 310 to the rotatable chamber 302. The rotatable chamber 302 receives sealant from the sealant supply 310 by way of the first sealant line 312. FIG. 3B is a close up view of the rotatable chamber disposed on the robot arm. As shown in FIG. 3B, a motor 316 is configured to rotate the rotatable chamber 302. The size and type of the motor 316 may vary according to application. In some embodiments, however, the motor 316 will rotate the rotatable chamber at about 1800 RPM. As the rotatable chamber 302 is rotated, gas within the sealant is separated from the sealant such that the gas-less sealant is urged towards the inner walls of the rotatable chamber 302 and gas is urged towards the center of rotatable chamber 302. Hollow opening 314 is arranged such that gas accumulating at the center of rotatable chamber 302 is ventable from the rotatable chamber 302. The hollow opening 314 may be constructed as a single tube (or other shape) with a first opening in the center of the rotatable chamber 302 and a second opening outside of the rotatable chamber 302. The hollow opening 314 may further be constructed as a plurality of tubes (or other shapes) with first openings at or near the center of the rotatable chamber 302 and second openings outside of the rotatable chamber 302 (see hollow openings 106 in FIGS. 1 and 2). Gas-less sealant is then urged to the end effector 306 by way of the second sealant line 313. The gas-less sealant may then be applied to the intended surface by the sealant dispensing nozzle 308.

In some embodiments, the flow of gas-less sealant to the end effector 306 may be controlled by a valve disposed on the second sealant line 313 between the rotatable chamber 302 and the end effector 306. The valve disposed on the second sealant line 313 can be of any variety including, but not limited to, a ball valve, a check valve, a flow control valve or a gate valve.

The sealant may be supplied to the rotatable chamber 302 by pressurizing the sealant at the sealant supply 310 such that sealant flows to the rotatable chamber 302 from the sealant supply 310. The sealant may be pressurized by a piston, pressurized gas source or other pressurization method as known in the art. The piston can be pneumatically actuated or powered by a human operator. In order for the sealant to travel from the sealant supply 310 to the rotatable chamber 302, the pressure differential between the sealant supply 310 and the rotatable chamber 302 should be at least about 100 psi.

The raw sealant provided by the sealant supply 310 may be any type of fluid including, but not limited to, a compressible fluid, an incompressible fluid, a thixotropic fluid or any combination thereof.

A method 400 of applying sealant to an aircraft is further disclosed. As shown in FIG. 4, the method 400 begins by receiving sealant at a rotatable chamber 402. The sealant may be provided to the rotatable chamber by a pneumatic piston, human powered piston, a cartridge, a pressurized gas source or other method for urging fluid as known in the art. The rotatable chamber is then rotated such that the sealant is separated into a gas-less sealant and a gas, wherein the gas is vented outside the rotatable chamber as shown in 404. The rotatable chamber may be rotated manually or by a motor. In some embodiments, the rotatable chamber will be rotated at about 1800 RPM. The gas-less sealant is then urged to an applicator as shown in 406. The method 400 may optionally include controlling a valve to release gas-less sealant at the applicator as shown in 408 and/or moving the applicator along a predetermined path with a robot arm as shown in 410.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The invention claimed is:

1. A system for removing gas from a sealant and transferring gas-less sealant to a gas-less sealant applicator, the system comprising:
    a rotatable chamber including:
        a first opening for receiving sealant, wherein the first opening is at a first axial end of the rotatable chamber;
        a hollow conduit arranged such that when gas accumulates in the center of the rotatable chamber when the rotatable chamber is rotating, the gas is ventable from the rotatable chamber,
            wherein the hollow conduit has at least one first hollow conduit opening at the center of the rotatable chamber and at least one second hollow conduit opening outside of the rotatable chamber and perpendicular to the at least one first hollow conduit opening;
        a second opening for receiving gas-less sealant from the rotatable chamber after the gas is vented from the hollow conduit,
            wherein the second opening is at a second axial end of the rotatable chamber, and
            wherein the first opening and the second opening are in line with each other;
    a motor operatively configured to rotate the rotatable chamber; and
    a gas-less sealant applicator in fluid communication with the second opening of the rotatable chamber such that gas-less sealant released by the second opening is flowable into the gas-less sealant applicator.

2. The system of claim 1 further comprising a sealant repository in fluid communication with the first opening of the rotatable chamber for providing the sealant to the first opening.

3. The system of claim 2 further comprising a pneumatic piston disposed such that the piston urges the sealant from the sealant repository to the first opening of the rotatable chamber.

4. The system of claim 2 further comprising a human-powered piston disposed such that the piston urges the sealant from the sealant repository to the first opening of the rotatable chamber.

5. The system of claim 1 further comprising a valve located between the second opening of the rotatable chamber and the gas-less sealant applicator.

6. The system of claim 1 wherein the motor rotates the rotatable chamber at least about 1800 RPM.

7. The system of claim 1 wherein the sealant is a thixotropic fluid.

8. The system of claim 1 wherein the sealant is a compressible fluid.

9. A method for applying sealant to an aircraft structure using the system of claim 1, the method comprising:
    receiving the sealant at the rotatable chamber;
    rotating the rotatable chamber such that:
        the sealant is separated into the gas-less sealant and the gas; and
        the gas is vented outside the rotatable chamber; and
    urging the gas-less sealant to the gas-less sealant applicator.

10. The method of claim 9, further comprising controlling a valve to release the gas-less sealant at the gas-less sealant applicator.

11. The method of claim 9 wherein the rotatable chamber is rotated at about 1800 RPM.

12. The method of claim 9 further comprising moving the gas-less sealant applicator along a predetermined path with a robot arm.

13. A system for providing sealant to an aircraft structure during manufacturing, the system comprising:
    a robot arm including an end effector with a sealant dispensing nozzle;
    a sealant supply including a supply of raw sealant;
    a rotatable chamber disposed on the robot arm, wherein the rotatable chamber includes
        a first opening for receiving the sealant, wherein the first opening is at a first axial end of the rotatable chamber;
        a hollow conduit arranged such that when gas accumulates in the center of the rotatable chamber when the rotatable chamber is rotating, the gas is ventable from the rotatable chamber,
            wherein the hollow conduit has at least one first hollow conduit opening at the center of the rotatable chamber and at least one second hollow conduit opening outside of the rotatable chamber and perpendicular to the at least one first hollow conduit opening;

a second opening for receiving gas-less sealant from the rotatable chamber after the gas is vented from the hollow conduit,
   wherein the second opening is at a second axial end of the rotatable chamber, and
   wherein the first opening and the second opening are in line with each other;
a motor operatively configured to rotate the rotatable chamber; and
a sealant line connected to the end effector and to the rotatable chamber,
wherein the sealant dispensing nozzle in fluid communication with the sealant line such that gas-less sealant released by the second opening is flowable into the sealant dispensing nozzle.

14. The system of claim 13 further comprising a valve disposed on the sealant line to control the flow of the gasless sealant to the end effector.

15. The system of claim 13 wherein the sealant supply is provided to the rotatable chamber by pressurizing the sealant at the source such that the sealant flows to the rotatable chamber.

16. The system of claim 13 wherein the sealant is a compressible fluid.

17. The system of claim 13 wherein the sealant is a thixotropic fluid.

18. The system of claim 13 wherein the motor rotates the rotatable chamber at least about 1800 RPM.

19. The system of claim 15 wherein the sealant is pressurized at the source by a pneumatic piston.

* * * * *